US012686340B2

(12) United States Patent　(10) Patent No.: US 12,686,340 B2

Fonseca et al.　(45) Date of Patent: Jul. 21, 2026

(54) DEVICE FOR STORAGE IN A CABIN OF A VEHICLE

(71) Applicant: Volvo Truck Corporation, Gothenburg (SE)

(72) Inventors: Anna Fonseca, Francheville (FR); Michel Fouet, Salagnon (FR); Patrick Dalmas, Valencin (FR)

(73) Assignee: Volvo Truck Corporation, Gothenburg (SE)

( * ) Notice: Subject to any disclaimer, the term of this patent is extended or adjusted under 35 U.S.C. 154(b) by 357 days.

(21) Appl. No.: 18/503,377

(22) Filed: Nov. 7, 2023

(65) Prior Publication Data

US 2024/0157882 A1　May 16, 2024

(30) Foreign Application Priority Data

Nov. 14, 2022　(EP) ..................................... 22207092

(51) Int. Cl.
　　*B60R 7/06*　　　(2006.01)
(52) U.S. Cl.
　　CPC ..................................... *B60R 7/06* (2013.01)
(58) Field of Classification Search
　　CPC ...................................................... B60R 7/06
　　See application file for complete search history.

(56) References Cited

U.S. PATENT DOCUMENTS

| | | | |
|---|---|---|---|
| 6,135,529 | A | 10/2000 | De Angelis et al. |
| 7,015,799 | B1 * | 3/2006 | Kitano ................ B60R 11/0264 |
| | | | 280/727 |
| 2004/0026947 | A1 | 2/2004 | Kitano et al. |
| 2016/0272120 | A1 * | 9/2016 | Johnston ................ B60N 3/102 |
| 2024/0157882 | A1 * | 5/2024 | Fonseca .................... B60R 7/06 |

FOREIGN PATENT DOCUMENTS

FR　　　　2791622 A1　10/2000

OTHER PUBLICATIONS

European Search Report for European Patent Application No. 22207092, completed May 5, 2023, 3 pages.

* cited by examiner

*Primary Examiner* — Aaron L Lembo

(74) *Attorney, Agent, or Firm* — Withrow & Terranova, PLLC

(57) ABSTRACT

A device for storage in a cabin of a vehicle, comprising a box and a supporting member, the supporting member being configured to be fixed on a floor of the cabin, the box being configured to be movably mounted on the supporting member, the box being movable between a driver's seat and a passenger's seat.

8 Claims, 3 Drawing Sheets

DEVICE FOR STORAGE IN A CABIN OF A VEHICLE

PRIORITY APPLICATIONS

The present application claims priority to European Patent Application No. 22207092.2, filed on Nov. 14, 2022, and entitled "DEVICE FOR STORAGE IN A CABIN OF A VEHICLE," which is incorporated herein by reference in its entirety.

TECHNICAL FIELD

The disclosure relates generally to storage equipment. In particular aspects, the disclosure relates to a device for storage in a cabin of a vehicle. The disclosure can be applied in heavy-duty vehicles, such as trucks, buses, and construction equipment. Although the disclosure may be described with respect to a particular vehicle, the disclosure is not restricted to any particular vehicle.

BACKGROUND

It is known to have a fixed device for storage in the cabin of a vehicle, in particular of a truck. The known fixed device is generally provided with recesses at both ends to allow driver and passenger to move in the cabin.

There is a need to improve the volume of storage of known devices.

SUMMARY

According to a first aspect of the disclosure, the disclosure relates to a device for storage in a cabin of a vehicle, comprising a box and a supporting member, the supporting member being configured to be fixed on a floor of the cabin, the box being configured to be movably mounted on the supporting member, the box being movable between a driver's seat and a passenger's seat.

The first aspect of the disclosure may seek to improve the storage volume without impacting the mobility of the driver or the passenger.

In some examples, the box is movable in translation, between a first position and a second position, the first position being towards the driver's seat to provide a first space on the floor between the passenger's seat and a first end of the box, and the second position being towards the passenger's seat to provide a second space on the floor between the driver's seat and a second end of the box. A technical benefit may include enabling the passenger to exit the passenger's seat using the first space, and enabling the driver to exit the driver's seat using the second space.

In some examples, the box is configured to be locked or unlocked in one of the first position and the second position.

In some examples, the box further comprises a first handle placed on the first end of the box. A technical benefit may include facilitating the moving, or the locking and unlocking of the box.

In some examples, the box further comprises a second handle placed on the second end of the box. A technical benefit may include further facilitating the moving, or the locking and unlocking of the box.

In some examples, the supporting member is a rail. A technical benefit may include enabling the moving of the box.

In some examples, the box is under the instrument panel. A technical benefit may include saving more space in the cabin.

In some examples, the box is further configured to be opened on a side of the box, the side of the box facing rearwards with respect to the cabin, and/or the side of the box facing upwards with respect to the cabin. A technical benefit may include enabling to reach an interior of the box to store objects or to collect stored objects.

According to a second aspect of the disclosure, the disclosure relates to a vehicle provided with a storage device according to any of the embodiments set forth herein above.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

There is a need to improve the volume of storage of known storage devices in cabin of vehicles, such as trucks. Therefore, the storage device can be made mobile from a first position enabling the driver to exit his seat, to a second position enabling the passenger to exit his seat. A locking system may be provided so that the storage device may be locked in either the first position, or in the second position.

Figure 1:
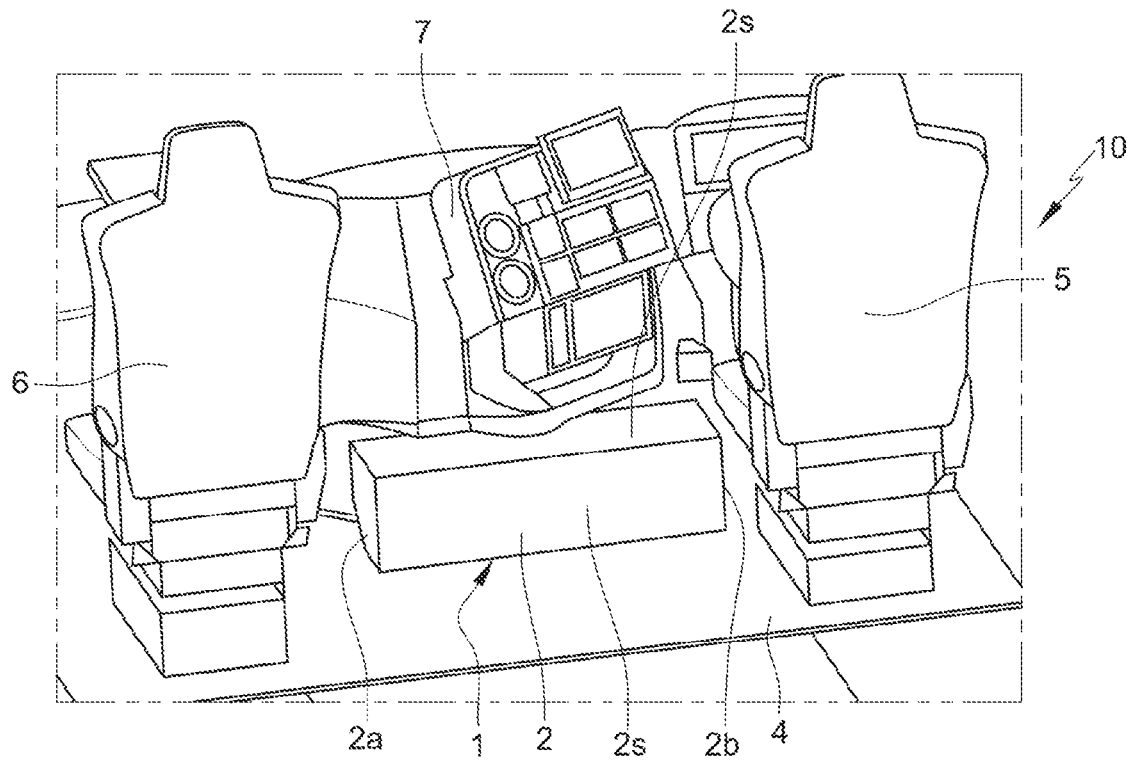
FIG. 1 is an exemplary device for storage in a cabin according to one example.
Figure 2:
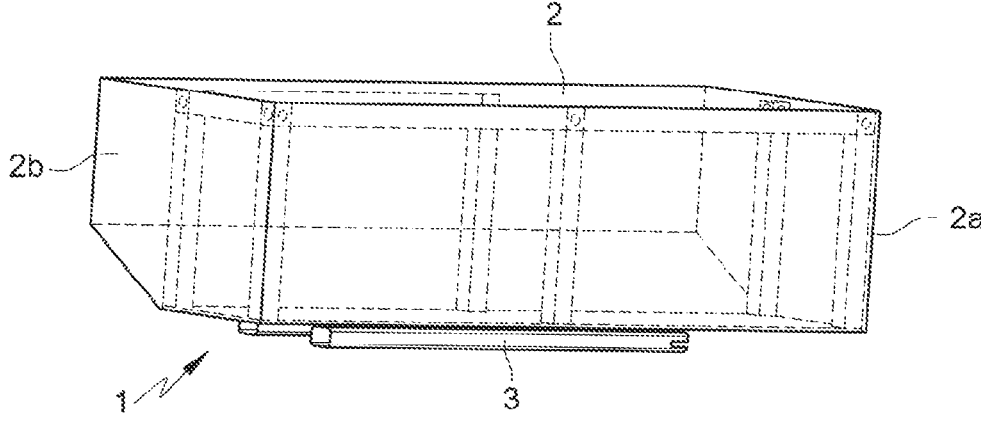
FIG. 2 is another exemplary device for storage in a cabin, mounted on rails, according to one example.

FIG. 1 is an exemplary storage device 1 according to one example of the inventive concept. The storage device 1, in the cabin 10, comprises a box 2 and a supporting member 3, such as one or more rails as illustrated in FIG. 2. The supporting member 3 is configured to be fixed on a floor 4 of the cabin 10, and the box 2 is configured to be movably mounted on the supporting member 3, the box 2 being movable between a driver's seat 5 and a passenger's seat 6.

According to these provisions, the storage volume is improved without impacting the mobility of the driver or the passenger.

Figure 3:
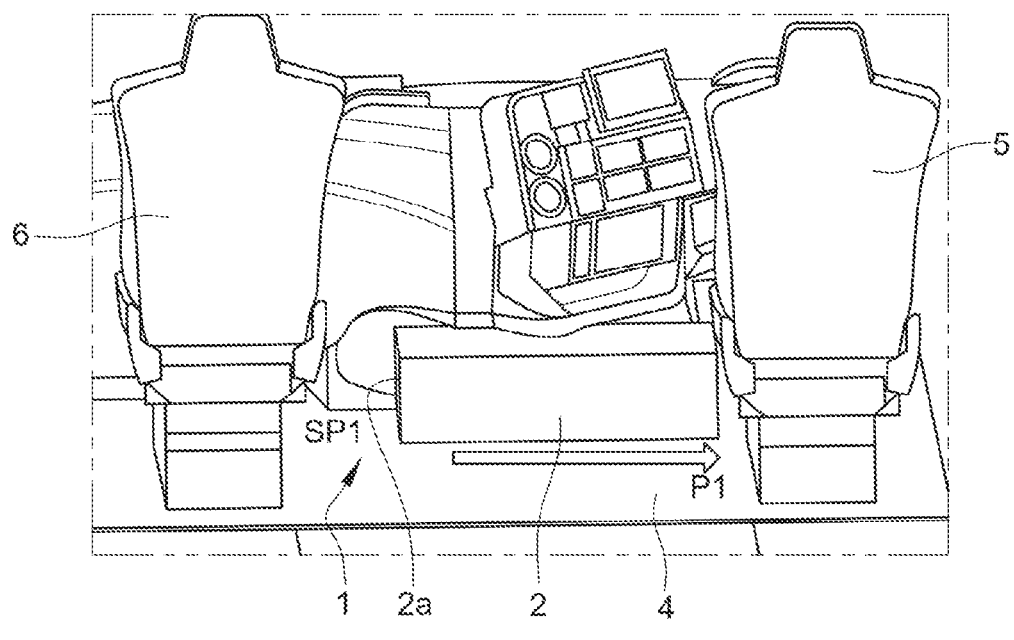
FIG. 3 is the exemplary device for storage in a cabin, according to the example of FIG. 1, wherein the box of the device is moved to the first position towards the driver's seat.
Figure 4:
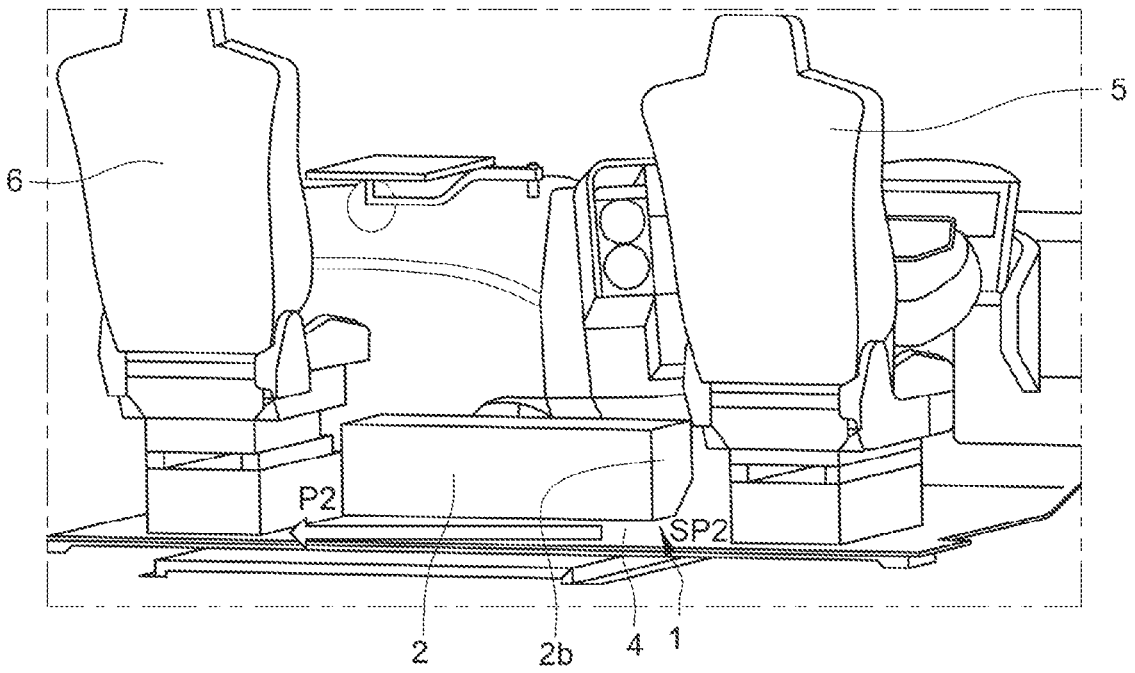
FIG. 4 is the exemplary device for storage in a cabin, according to the example of FIG. 1, wherein the box of the device is moved to the second position towards the passenger's seat.

As illustrated in FIG. 3 and FIG. 4, the box 2 of the device 1 may be movable in translation, between a first position P1 and a second position P2; as illustrated more particularly on FIG. 3, the first position P1 may be towards the driver's seat 5 to provide a first space SP1 on the floor 4 between the passenger's seat 6 and a first end 2a of the box 2; when the box is fixed in this first position P1, the passenger may exit the passenger's seat using the first space SP1; as illustrated more particularly on FIG. 4, the second position P2 may be towards the passenger's seat 6 to provide a second space SP2 on the floor 4 between the driver's seat 5 and a second end 2b of the box 2; when the box is fixed in this second position P2, the driver may exit the driver's seat using the second space SP2.

According to these provisions, the first space enables the driver to exit the driver's seat, and the second space enables the passenger to exit the passenger's seat, while the storage volume of the box is improved with respect to a fixed box providing space at both ends for the driver and for the passenger to exit their respective seats.

The box 2 of the storage device 1 may be configured to be locked in one of the first position P1 and the second position P2. The locking mechanism is known from the man skilled in the art, and is not represented on the figures.

Figure 5:
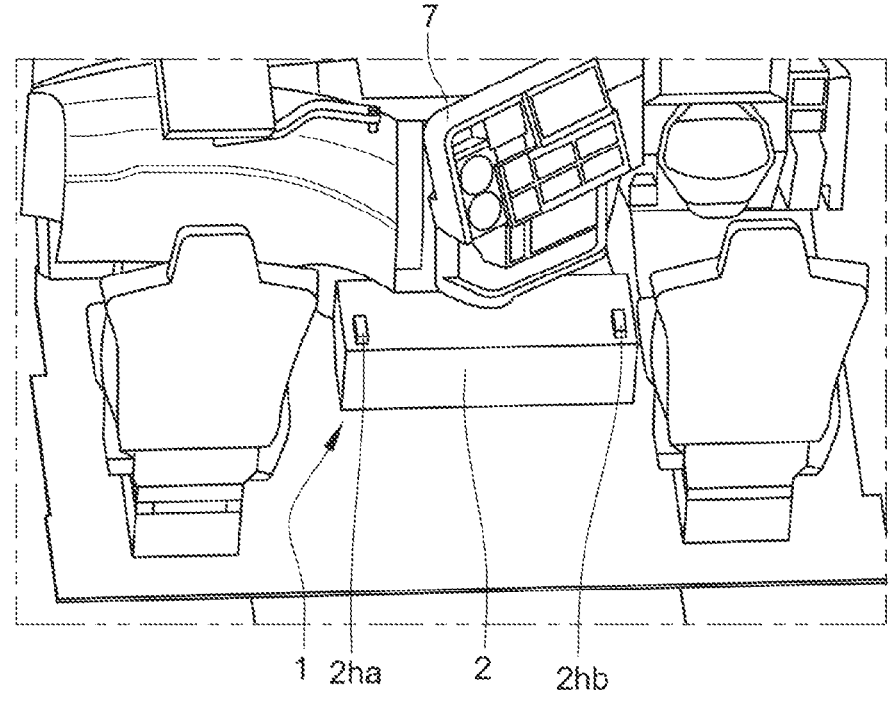
FIG. 5 is the exemplary device for storage in a cabin, according to another example, wherein the box of the device is provided with handles.

As illustrated in FIG. 5 the box may further comprise a first handle 2ha placed on the first end 2a of the box 2, and/or a second handle 2hb placed on the second end 2b of the box 2.

According to these provisions, the handles may be configured to lock, unlock, and move the box.

The box 2 of the storage device 1 may be further configured to be opened on a side 2s of the box 2, the side 2s of the box 2 facing rearwards with respect to the cabin 10, and/or the side 2s of the box 2 facing upwards with respect to the cabin 10. Thus the first space SP1, and the second space SP2, are left free for the passenger and the driver to move from or to their respective seats.

The device 1 may also be placed on the floor and under the instrument panel 7, as illustrated for example on FIG. 5.

According to an aspect, the inventive concept relates to a vehicle comprising a storage device 1 according to anyone of the examples described above.

The terminology used herein above is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A device for storage in a cabin of a vehicle, comprising:
   a supporting member configured to be fixed on a floor of the cabin; and
   a box configured to be movably mounted on the supporting member, the box being laterally movable between:
      a first position closer to a driver's seat than a front passenger's seat to provide a first space between the front passenger's seat and a first end of the box; and
      a second position closer to the front passenger's seat than the driver's seat to provide a second space between the driver's seat and a second end of the box.

2. The device of claim 1, wherein the box is configured to be locked or unlocked in one of the first position and the second position.

3. The device of claim 1, wherein the box further comprises a first handle placed on the first end of the box.

4. The device of claim 1, wherein the box further comprises a second handle placed on the second end of the box.

5. The device of claim 1, wherein the supporting member is a rail.

6. The device of claim 1, wherein the box is under the instrument panel.

7. The device of claim 1, wherein the box is further configured to be opened on a side of the box, the side of the box facing rearwards with respect to the cabin, and/or the side of the box facing upwards with respect to the cabin.

8. A vehicle comprising the device of claim 1.

* * * * *